United States Patent [19]

Sturges

[11] Patent Number: 4,546,742
[45] Date of Patent: Oct. 15, 1985

[54] TEMPERATURE CONTROL SYSTEM FOR INTERNAL COMBUSTION ENGINE

[75] Inventor: Fred D. Sturges, Rockford, Ill.

[73] Assignee: Borg-Warner Corporation, Chicago, Ill.

[21] Appl. No.: 573,190

[22] Filed: Jan. 23, 1984

[51] Int. Cl.[4] .......................... F01P 3/12; F01P 11/10
[52] U.S. Cl. .............. 123/41.05; 123/41.12; 123/41.31; 123/41.33; 60/599
[58] Field of Search ............. 123/41.02, 41.05, 41.06, 123/41.08, 41.09, 41.1, 41.11, 41.12, 41.31, 41.33, 41.49, 196 AB; 236/35; 60/599

[56] References Cited

U.S. PATENT DOCUMENTS

| | | | |
|---|---|---|---|
| 3,377,023 | 4/1968 | Costa et al. | 236/35 |
| 3,439,657 | 4/1969 | Gratzmuller | 123/41.31 |
| 4,063,431 | 12/1977 | Dankowski | 123/196 AB |
| 4,065,052 | 12/1977 | Ridenour | 123/41.06 |
| 4,228,880 | 10/1980 | Gee | 192/58 B |

FOREIGN PATENT DOCUMENTS 58-124017  7/1983  Japan .............................. 123/41.12

Primary Examiner—William A. Cuchlinski, Jr.
Attorney, Agent, or Firm—James E. Tracy

[57] ABSTRACT

When additional heat exchangers, such as oil coolers and turbocharged air coolers, are mounted in front of or within the normal coolant heat exchanger or radiator of an internal combustion engine, a variable speed fan drive may be employed to blow air through all of the heat exchangers to cool the various fluids flowing through those heat exchangers. Since the different fluids usually have different desired operating temperature ranges for optimum engine performance, controlling the variable speed fan drive only in response to the temperature of the engine coolant can result in overheating of at least one of the other fluids. This is avoided by temperature sensing the different fluids and effectively determining which one of them has the highest relative temperature in its operating range. The fan drive is then controlled in response to the sensed temperature of that particular fluid. In this way, all of the fluids will be maintained within their desired operating temperature ranges. If the condenser of an air conditioning system is also positioned in front of the engine coolant radiator, the compressor discharge pressure in the system may be monitored and if it exceeds a preset maximum allowable level the fan is automatically driven at full speed to maximize the air pulled in through the condenser, and of course through all of the other heat exchangers, to quickly decrease the refrigerant temperature and thus the discharge pressure.

3 Claims, 2 Drawing Figures

TEMPERATURE CONTROL SYSTEM FOR INTERNAL COMBUSTION ENGINE

BACKGROUND OF THE INVENTION

This invention relates to a temperature control system for an internal combustion engine having a plurality of separate heat exchangers, one of which may be a coolant radiator, for cooling various fluids used in the engine.

Increased fuel efficiency is obtained in large internal combustion engines, such as those used in trucks, by providing additional heat exchangers in front of, or within, the normal engine coolant radiator in order to cool some of the fluids required to operate the engine, such as the lubricating oil and the turbocharged air when a turbocharger is employed. Optimum engine performance is obtained when the temperatures of those fluids, as well as that of the engine coolant, are established at desired levels. Air becomes hotter when it is compressed in a turbocharger. For maximum efficiency, however, the heat picked up in the compression process should be removed, to maintain the air's density, before the air is fed to the engine. Thus, it is common practice to run the pressurized air through an air cooler after it leaves the turbocharger and before it enters the engine.

A variable speed fan drive, controlled in response to the engine coolant temperature, is usually provided to blow through the coolant radiator, as well as through the other heat exchangers, the amount of air that is needed to maintain the coolant temperature at the level which will achieve optimum engine performance. Unfortunately, the fluids to be cooled by the various heat exchangers normally have different desired operating temperature ranges for best performance. As a consequence, when the amount of cooling air drawn in by the fan is determined by the engine coolant temperature, the temperatures of one or more of the other fluids may rise well above their desired operating ranges, the overall engine performance thereby suffering and becoming less efficient.

The present invention overcomes this shortcoming of prior engines having multiple heat exchangers and controls the fan drive in such a way that the fluids cooled by those heat exchangers never exceed their operating temperature ranges, thereby improving and optimizing the engine performance.

SUMMARY OF THE INVENTION

In its broadest aspects, the invention provides a temperature control system for an internal combustion engine having first and second heat exchangers for cooling first and second fluids, respectively, used in the engine, the two fluids having different desired operating temperature ranges for optimum engine performance. The temperature control system comprises a first temperature sensor for sensing the temperature of the first fluid, and a second temperature sensor for sensing the temperature of the second fluid. A variable speed fan drive is provided for blowing a controlled amount of air through the first and second heat exchangers to effect cooling of the first and second fluids. There are means, coupled to the first and second temperature sensors, for controlling the variable speed fan drive in response to the sensed temperature of the particular fluid which is at the highest relative temperature in its operating range.

More specifically, the first heat exchanger may be the normal coolant radiator for cooling the engine coolant and the second heat exchanger may be an oil cooler for cooling the engine's lubricating oil. First temperature sensing means, which includes the first temperature sensor, produces a first temperature signal having an amplitude directly proportional to the relative level of the sensed coolant temperature within the coolant's operating temperature range. Second temperature sensing means, which includes the second temperature sensor, develops a second temperature signal having an amplitude directly proportional to the relative level of the sensed oil temperature within the oil's operating temperature range. Means are provided for effectively selecting the particular one of the two temperature signals having the highest amplitude. The variable speed fan drive is then controlled in response to the selected temperature signal.

DESCRIPTION OF THE DRAWINGS

The features of the invention which are believed to be novel are set forth with particularity in the appended claims. The invention may best be understood, however, by reference to the following description in conjunction with the accompanying drawings in which like reference numbers identify like elements, and in which:

DESCRIPTION OF THE ILLUSTRATED EMBODIMENTS

Figure 1:
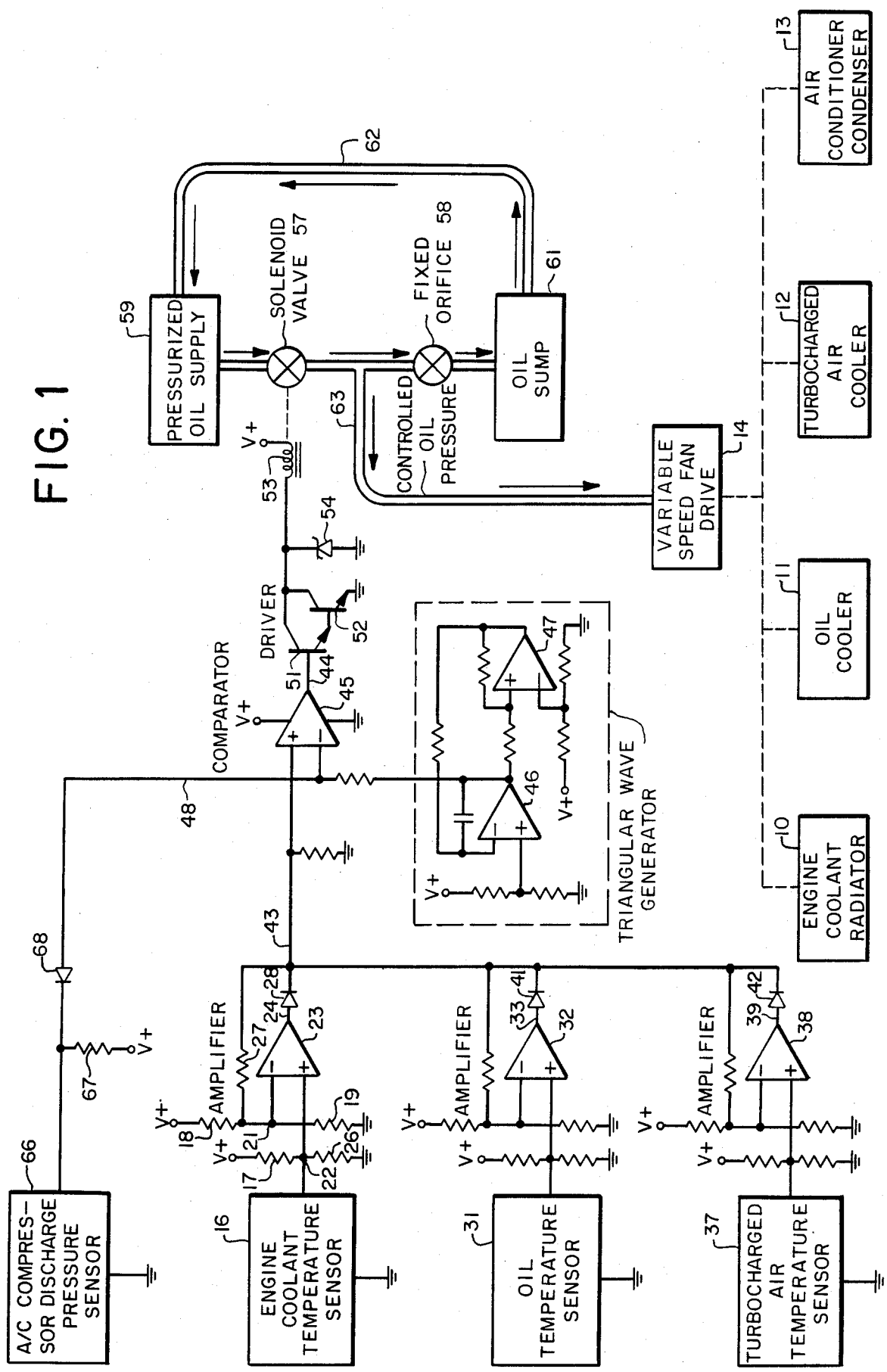
FIG. 1 schematically illustrates a temperature control system, for an internal combustion engine, constructed in accordance with one embodiment of the invention; and, FIG. 2 shows a temperature control system constructed in accordance with another embodiment.

It will be assumed that the temperature control system shown in FIG. 1 is incorporated in a truck engine, but it will be apparent that the invention can be employed with any internal combustion engine having a plurality of heat exchangers for cooling a corresponding plurality of different fluids each of which has a different desired operating temperature range. It will also be assumed in the FIG. 1 embodiment that the internal combustion engine is cooled in conventional manner by circulating coolant around the engine jacket under the control of a thermostat or flow control valve. After the engine is started and as the engine warms up, the thermostat controls the flow of coolant from the engine jacket to the coolant radiator, schematically shown by block 10. As the engine temperature, and consequently the coolant temperature, rise during the warm-up period, a larger and larger amount of coolant will be diverted by the thermostat from the engine jacket to the radiator 10 to dissipate the engine heat. When the thermostat becomes fully open, all of the coolant is circulated through the radiator.

As shown in FIG. 1, the truck has three other heat exchangers in addition to the conventional engine coolant radiator 10, namely, oil cooler 11, turbocharged air cooler 12 and condenser 13 for the truck's air conditioning system. Customarily, heat exchangers 11, 12 and 13 would be mounted in front of radiator 10, but one or more of those heat exchangers could be positioned or formed within the radiator. With this arrangement, the fluids flowing through the four heat exchangers 10–13 will all be cooled in the same manner, namely by ram air and/or air blown through the heat exchangers by a cooling fan driven by variable speed fan drive 14 in a manner to be explained. Ram air is the effective air that, due to the truck's velocity, impinges on the heat exchangers. As is well-known, the refrigerant of the air conditioner flows through condenser 13 so that the heat absorbed by the refrigerant in the evaporation phase of the refrigeration cycle is dissipated. Although not shown in FIG. 1, the truck may also be equipped with controllable radiator shutters which are like venetian blinds and would be positioned in front of all four heat exchangers. The shutters would be opened in response to the engine temperature, after the thermostat is fully opened but before the fan is turned on. Depending on engine load or external conditions, the ram air passing through the shutters may be sufficient to provide the required cooling for the heat exchangers and it may not be necessary to operate variable speed fan drive 14.

Temperature sensor 16 senses the coolant temperature and preferably is located at a convenient point in the coolant flow path where the coolant will be the hottest. For example, the sensor may be positioned at the top of the engine block to sense the temperature of the coolant in the engine jacket. Sensor 16 comprises a thermistor having a positive temperature coefficient so that its resistance is directly proportional to the coolant temperature. Resistors 17, 18 and 19 in conjunction with the resistance of sensor 16 form a bridge circuit. As the sensed coolant temperature changes, the voltage across circuit junctions or points 21 and 22 varies proportionally. Since sensor 16 has a positive temperature coefficient, when the engine coolant temperature increases, for example, the resistance of the sensor increases and the voltage at junction 22 increases relative to the fixed voltage at junction 21. Differential amplifier 23 amplifies the voltage difference between junctions 21 and 22 to produce at the amplifier's output, and on conductor 24, a voltage signal having an amplitude which is a function of the sensed coolant temperature. Resistors 26 and 27 control the amount of amplification. The purpose of diode 28 will be made apparent later.

By a proper selection of sensor 16 and the resistors associated with differential amplifier 23, the amplifier will effectively operate only when the coolant is within its desired operating temperature range and thus will respond only to changes within that range. To explain, assume that the desired operating temperature range for the coolant extends from 185° F. to 200° F. Until the coolant temperature reaches 185°, the voltage at circuit junction 22 will be less than that at junction 21 and the output voltage on conductor 24 will be zero. As the coolant temperature increases from 185° to 200°, the output voltage of amplifier 23 varies from zero volts to its maximum level V+, which may, for example, be +12 volts d-c. This means that each time the temperature increases one degree, within the 185°–200° range, the output voltage on conductor 24 will increase 0.8 volts. If the coolant temperature exceeds 200°, the output voltage, of course, remains at +12 volts. In short, the output voltage on conductor 24 varies over the amplitude range from zero to +12 volts as the temperature of the coolant changes over its desired operating temperature range from 185° to 200°. The voltage signal on conductor 24 may therefore be called a coolant temperature signal having an amplitude which is directly proportional to the relative level of the sensed coolant temperature within the coolant's operating temperature range.

Sensor 31 senses the temperature of the lubricating oil and preferably is located at some point where the oil will be the hottest. The sensor may also take the form of a thermistor having a positive temperature coefficient. It is connected to a differential amplifier 32 through a bridge circuit identical to that associated with amplifier 23. The only difference between the oil temperature sensing system and the coolant temperature sensing system is that sensor 31 and the resistors connected to amplifier 32 are chosen so that the amplifier responds only to its input voltage when the lubricating oil is within its desired operating temperature range, which, for example, may be from 210° F. to 220° F. If the oil temperature is below 210° the output voltage on conductor 33 will be zero, whereas above 220° the output voltage will be V+, or +12 volts. As the oil temperature changes in the range from 210° to 220° the differential amplifier 32 will respond and the voltage on conductor 33 will rise from zero to +12 volts, a 1.2 volts increase for each degree increase. Thus, conductor 33 provides an oil temperature signal having an amplitude which is directly proportional to the relative level of the sensed oil temperature within the oil's operating temperature range.

In similar fashion, sensor 37, differential amplifier 38 and the associated resistors are constructed so that an output voltage will be produced on conductor 39 to represent the temperature of the turbocharged air. When the air temperature is below its desired operating temperature range, assumed to be from 130° F. to 150° F., the output voltage on conductor 39 will be zero, and as the temperature rises from 130° to 150° the voltage on conductor 39 changes from zero to +12 volts, increasing 0.6 volts each time the temperature increases one degree. Amplifier 38 therefore provides on conductor 39 a turbocharged air temperature signal whose amplitude represents the relative level of the sensed turbocharged air within the air's operating temperature range 130°–150°.

Diode 28 and its counterpart diodes 41 and 42 provide a maximum amplitude detector which effectively selects, for application to conductor 43, the particular one of the three temperature signals (on conductors 24, 33 and 39) having the highest or greatest amplitude. In other words, if one of the temperature signals is, for example, +9.5 volts and the other two signals are less than that, the voltage translated to conductor 43 will be +9.5 volts minus one diode drop (approximately 0.7 volt).

With the described circuit arrangement the signal on conductor 43 will represent the sensed temperature of the particular one of the three fluids (engine coolant, lubricating oil and turbocharged air) which is at the highest relative temperature in its operating temperature range. As will be explained, fan drive 14 is controlled by the temperature signal on line 43. In this way, the temperature control system operates in response to the hottest one of the three fluids. Of course, if all of the fluids are below their operating temperature ranges conductor 43 will be established at zero potential and the fan drive will be de-energized since under those conditions it is not desired to blow air through the heat exchangers 10–13. Assume now, by way of example, that the temperature of each fluid is in its operating range, the coolant being 189° F., the oil being 213° F. and the turbocharged air being 137° F. The output voltages on conductors 24, 33 and 39 will thus be +3.2, +3.6 and +4.2 volts, respectively. Since the turbocharged air temperature will have the highest relative temperature in its operating range, the +4.2 volts on conductor 39 will be the selected temperature signal and will be applied through diode 42 to conductor 43 to exercise control over fan drive 14.

Assume now that the coolant and turbocharged air are well within their desired temperature ranges but that the oil temperature has climbed to 225°, five degrees over the upper limit of its range. The voltage on conductor 33 will therefore be +12 volts and this voltage will be translated through diode 41 to conductor 43 to provide the controlling temperature signal for fan drive 14.

In response to the selected temperature signal on line 43, a driving signal is developed on line 44 having a characteristic which is a function of the sensed temperature represented by the selected temperature signal. More specifically, a pulse width modulation circuit 45, 46, 47 is provided to produce on line 44 a pulse width modulated signal having a waveshape determined by the selected temperature signal on line 43. To explain, a pulse width modulated signal is rectangular shaped, containing periodically recurring positive-going pulse components with intervening negative-going pulse components. The frequency will be constant but the relative widths of the positive and negative pulse components will vary depending on the amplitude of the temperature signal. As the width or duration of each positive pulse component increases, each negative pulse component decreases proportionately, and vice versa. In other words, since the period or time duration of a complete cycle is constant, when the duration of a positive pulse component changes in one sense or direction the width of the immediately succeeding negative pulse component must change in the opposite sense. The pulse width modulated signal has a duty cycle characteristic which is the ratio of the width of each positive-going pulse compared to the duration of a complete cycle.

In the pulse width modulation circuit, amplifiers 46 and 47, and their associated circuit elements, form a well-known triangular wave generator or oscillator for supplying a triangular shaped voltage signal to the negative or inverting input of comparator 45, the positive or non-inverting input of which receives the selected temperature signal over line 43. Preferably, the frequency of the triangular shaped signal is around 10 hertz. Ignoring for now the effect of the circuit connected over line 48 to the negative input of comparator 45, the voltage at that negative input will vary alternately above and below the voltage level of the temperature voltage signal at the positive input. Each time the alternating voltage at the negative input drops below the temperature voltage at the positive input, the output voltage of comparator 45 abruptly switches from ground or zero volts to V+, or +12 volts d-c, where it remains until the triangular shaped voltage signal at the negative input becomes greater than the temperature voltage signal at the positive input. At that instant, the output voltage of the comparator switches from its high level (V+) back to its low level or zero. The greater the amplitude of the selected temperature signal, the greater the time intervals during which the output of comparator 45 is established at its high potential level and the smaller the time intervals when the output is at zero potential. In this way, the output of comparator 45 provides a pulse width modulated, rectangular shaped signal having a 12 volts peak-to-peak amplitude, the relative widths of the alternating positive-going and negative-going pulses being modulated under the control of the selected temperature signal on line 43. The duty cycle of the pulse width modulated signal is the ratio of the time interval of one positive pulse component compared to a complete cycle, namely the total time duration of one positive pulse component and one negative pulse component. Hence, the duty cycle of the pulse width modulated signal on line 44 will be directly proportional to the sensed temperature represented by the selected temperature signal.

The pulse width modulated signal, or driving signal, operates the driver, comprising transistors 51 and 52, to effectively apply that signal to solenoid coil 53. The V+ operating potential at the right terminal of coil 53 may also be +12 volts. During each positive-going pulse when the output of comparator 45 is established at its high level, transistors 51 and 52 conduct and the left terminal of coil 53 will be essentially grounded, thereby applying a full 12 volts d-c across the coil. During the intervening negative-going pulses, when the output of comparator 45 is zero, transistors 51 and 52 will be turned off and coil 53 will be de-energized. Hence, coil 53 is alternately energized and de-engerized, namely cycled on and off, and its duty cycle is the same as, and is determined by, the duty cycle of the pulse width modulated signal. Zener diode 54 protects transistors 51 and 52 against inductive voltage spikes generated by coil 53 turning off.

Solenoid off-on valve 57 is controlled by solenoid coil 53, and since it is turned on and off at a relatively fast rate, the valve effectively provides a variable orifice or opening the size of which is determined by the energization of coil 53. Each time coil 53 is energized valve 57 is opened, and when the coil is de-energized the valve is closed. Thus, the greater the energization of coil 53, namely the greater the duty cycle, the less restriction introduced by valve 57 and the greater the effective opening or orifice.

Solenoid valve 57 is interposed in series with an oil circuit, the oil flowing from a pressurized oil supply 59 through valve 57 and then through a fixed orifice 58 to an oil sump 61, from which the oil is returned over oil line 62 to the pressurized oil supply 59 which would include an oil pump. Of course, in an internal combustion engine, especially a truck engine, many sources of oil pressure are readily available. The engine oil pressure may be used, or pressurized oil may be obtained from the transmission supply. Moreover, and as will be made apparent, oil pressure is not essential. Any source of pressurized fluid will suffice. For example, air pressure from air compressors, usually included in trucks, may be employed.

With the illustrated oil circuit, the oil pressure in oil line 63, which connects to the junction between valve 57 and fixed orifice 58, will constitute a controlled fluid (oil) pressure which is a function of and represents the sensed temperature of whichever one of the coolant, oil or turbocharged air is at the highest relative temperature in its operating range. Specifically, the controlled oil pressure in line 63 is directly proportional to the sensed temperature. To explain further, if the hottest one of the coolant, oil and turbocharged air is still relatively low in its operating temperature range (assume, for example, that two of the fluids are below their operating temperature ranges while the third is at the low end of its range), the duty cycle of solenoid valve 57 will likewise be relatively low and the effective opening of valve 57 will be relatively small. As a result, the restriction to the flow of oil through valve 57 will be relatively high causing the pressure drop across the valve to be relatively high, with most of the oil pressure drop from pressurized oil supply 59 to oil sump 61 being dropped across valve 57, rather than across fixed orifice 58. As the temperature signal on line 43 increases in amplitude the duty cycle of coil 53 increases and the effective opening of valve 57 becomes larger, thereby introducing less restriction to the oil flow and less pressure drop. Consequently, as the temperature of the hottest fluid rises the pressure drop decreases across valve 57 and increases across fixed orifice 58, causing the oil pressure in oil line 63 to increase toward the oil supply pressure as the temperature increases.

The controlled oil pressure in oil line 63 governs the operation of variable speed fan drive 14 to control the temperatures of the coolant, oil and turbocharged air. If the temperatures of all three fluids are below their operating ranges, conductor 43 will be at zero volts and the controlled oil pressure will be so low that fan drive 14 will remain de-energized. If the engine is cold enough at this time the thermostat will be in its fully closed position so that the engine coolant will be circulated by the coolant or water pump only around the engine jacket. Radiator shutters, if used, would also be fully closed so no ram air would strike the four heat exchangers 10–13. As the engine temperature and the coolant temperature increase, the thermostat opens in proportion to the temperature rise, allowing the coolant trapped in the engine jacket to flow through the radiator to dissipate the heat absorbed from the engine by the coolant. When the thermostat fully opens, all of the coolant will be circulated through the radiator to be cooled down. If at that time insufficient cooling occurs in the radiator, causing the engine temperature to continue rising, radiator shutters, if used, would begin to open, allowing more and more ram air to impinge on the heat exchangers thereby increasing the heat dissipation. In the meantime, the oil temperature and the turbocharged air temperature tend to increase but these temperatures will be affected by the air passing through oil cooler 11 and turbocharged air cooler 12.

Depending on the vehicle's speed, the load on the engine, and the ambient temperature of the outside air, the cooling may be sufficient to keep all three of the temperature controlled fluids just under their operating temperature ranges. If this occurs, conductor 43 will remain at zero volts and the fan drive 14 will remain de-energized. On the other hand, if the temperature of any one of the coolant, oil and turbocharged air rises and enters its operating temperature range, the temperature voltage signal on conductor 43 increases above zero, whereupon the controlled oil pressure in line 63 increases to the extent that fan drive 14 starts rotating the fan to draw air through the heat exchangers 10–13. If the temperature still keeps rising, the increasing oil pressure causes the fan drive 14 to gradually increase the fan speed until the cooling effect is sufficient to stabilize the temperature within the operating range. Of course, the fan will cool all of the fluids flowing through heat exchangers 10–13 but whichever one of the coolant, oil and turbocharged air becomes hottest within its operating range that particular fluid will determine the voltage on conductor 43 and will exercise control over fan drive 14, setting the fan speed at the level necessary to maintain the hottest fluid within its operating range. The temperature control system of the invention thus controls the temperatures of the coolant, oil and turbocharged air, preventing each of them from exceeding its operating temperature range.

In the event that the cooling imparted to the refrigerant in condenser 13 is less than that needed for proper operation of the air conditioning system, the refrigerant temperature rises and this causes the compressor discharge pressure to increase. Unless that pressure is checked or limited, the cut off on the compressor will operate to turn the compressor, and thus the air conditioning system, off. If the condensing temperature and discharge pressure reach undesired levels the fan is automatically and immediately driven at its maximum speed to maximize the air flow through the condenser 13 to lower the refrigerant temperature and pressure. This is accomplished by means of an override circuit which functions when the discharge pressure is too high and causes the controlled oil pressure in line 63 to increase to the level necessary to run the fan at its top speed.

More particularly, an air conditioner compressor discharge pressure sensor 66 senses the pressure of the refrigerant at the discharge outlet of the compressor and produces an override signal, for application over line 48 to the negative input of comparator 45, when the sensed discharge pressure exceeds a predetermined maximum allowable level. Preferably, sensor 66 is merely a pressure-actuated off-on switch. When the discharge pressure is normal, the switch is open and the positive d-c voltage applied, via resistor 67, to the cathode of diode 68 maintains the diode cut-off. However, when the maximum allowable discharge pressure is exceeded the switch in sensor 66 closes and grounds the cathode of diode 68. The diode thereupon conducts and establishes line 48 and the negative input of comparator 45 at ground or zero potential. With the negative input now being held at a voltage no greater than that on the positive input, the comparator's output will be maintained at its high level to cause continuous engerization of coil 53. This maximizes the oil pressure in line 63 to drive the fan at its maximum speed. In short, the override circuit 48, 67, 68, in response to the pressure sensor 66 when the sensed discharge pressure exceeds the maximum allowable level, overrides the operation of the pulse width modulation circuit 45, 46, 47 to change the oil pressure as necessary to maximize the fan speed and thus the air drawn in through the condenser and the other heat exchangers, thereby reducing the refrigerant temperature in the condenser and consequently the refrigerant discharge pressure.

The temperature control system disclosed in FIG. 1 may be modified to provide a controlled oil pressure which is inversely proportional to the sensed temperature represented by the selected temperature signal on line 43. This is achieved merely by reversing the order of solenoid valve 57 and fixed orifice 58 in the oil circuit. At low temperatures (low voltage on conductor 43) valve 57 would introduce a high flow restriction and most of the pressure drop would be across that valve, the oil pressure at the junction of orifice 58 and valve 57 thereby being high. Conversely, at high temperatures (high voltage on conductor 43) valve 57 would present a low flow restriction and most of the pressure drop would be across orifice 58. Of course, the pressure actuated, variable speed fan drive 14 would have to be of the type that operates in a reverse manner as previously explained. In other words, at low temperatures when the controlled oil pressure begins to drop from its maximum level as the fluids heat up, fan drive 14 would be inoperative. If the temperatures of the fluids continue to increase into the temperature ranges, over which the fan drive operates, the oil pressure continues to drop and causes the fan speed to gradually increase until the necessary amount of air is pulled through the heat exchangers to properly cool the fluids and to prevent them from exceeding their operating temperature ranges. An advantage of this variation of the invention is that since the lower the oil pressure the greater the cooling imparted to the heat exchangers, if there is a failure in the oil supply or valve opening maximum cooling will occur. The fan will be driven by fan drive 14 at its maximum speed. This is a safety feature to prevent engine overheating and compressor damage in the event of a breakdown in the source of pressurized fluid, whether it is pressurized oil, compressed air, etc.

Figure 2:
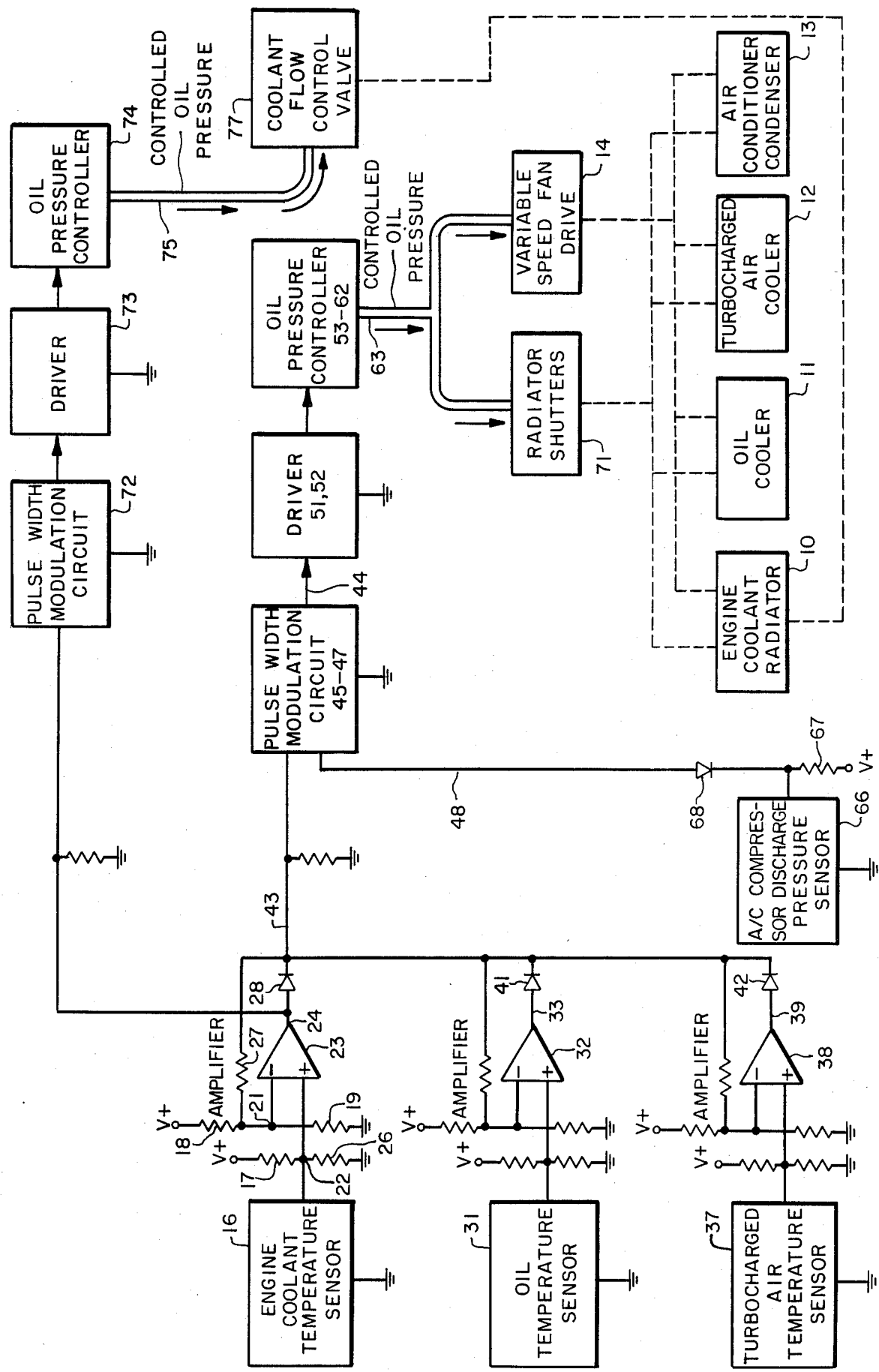

In the embodiment of FIG. 2, the coolant flow control valve, rather than being a conventional thermostat which effectively includes a temperature sensor, is a separate valve controlled by the coolant temperature signal produced on conductor 24. In addition, controllable radiator shutters are provided and these shutters are sequentially operated, before the variable speed fan drive is energized, in response to the temperature of the particular one of the coolant, oil and turbocharged air which is at the highest relative level, or hottest, within its operating range. To explain, as indicated by the like reference numbers, a major portion of the control system of FIG. 2 is identical in construction and operation to the FIG. 1 control system. For simplicity, the pulse width modulation circuit 45, 46, 47 and the driver 51, 52 have been illustrated as single blocks in FIG. 2. Moreover, the entire oil pressure controller, formed by elements 53-62, has been shown by a single block in FIG. 2. Hence, the controlled oil pressure in line 63 will be produced in the same manner as in FIG. 1, being a function of the selected temperature signal on conductor 43, which in turn represents the sensed temperature of the hottest one of the coolant, oil and turbocharged air within its operating range. As shown in FIG. 2, the controlled oil pressure in line 63, in addition to controlling the variable speed fan drive 14, also adjusts the radiator shutters 71 for regulating the amount of ram air impinging on the four heat exchangers 10-13.

Pulse width modulation circuit 72, driver 73 and oil pressure controller 74 provide an arrangement of identical construction as elements 45-62. Since pulse width modulation circuit 72 is controlled only by the coolant temperature signal on conductor 24, the controlled oil pressure produced in oil line 75 will be a function of and will represent the sensed coolant temperature. This oil pressure governs the operation of coolant flow control valve 77 which would replace the conventional thermostat. At very low coolant temperatures when the engine is cold, the voltage on conductor 24 will be zero as a result of which the controlled oil pressure in line 75 will be so low that coolant flow control valve 77 will remain in its normally-closed position, thereby forcing the coolant to circulate only around the engine jacket. At this time, the controlled oil pressure in oil line 63 will be sufficiently low that radiator shutters 71 will be fully closed and fan drive 14 will be off. When the engine warms up to the extent that the coolant temperature signal on conductor 24 begins to increase, the oil pressure in line 75 will be increased as necessary to open control valve 77 to allow the coolant to circulate through the radiator 10 to dissipate heat absorbed by the coolant. The radiator shutters 71 and fan drive 14 will be unaffected since they may be constructed so they will not operate in response to the low oil pressure in line 63 at that time.

If the coolant temperature continues to increase, and assuming that the coolant is the hottest of the three fluids (coolant, oil and turbocharged air), the relatively low amplitude of the temperature signal on conductor 43 will be sufficient to produce in line 63 an oil pressure to open the radiator shutters 71 to a controlled extent, thereby adjusting the amount of ram air striking the heat exchangers 10-13. The system is designed so that the oil pressure that controls radiator shutters 71 will be insufficient to energize fan drive 14. Thus, the radiator shutters will always be opened before the fan drive is turned on.

Further increases in the coolant temperature increases the amplitude of the temperature signal on conductor 43 into an amplitude range which will cause the oil pressure in line 63 to increase sufficiently to turn on the fan drive 14 and to set the fan speed to the level dictated by the temperature signal, as a consequence of which the cooling effect by the air pulled in through the heat exchangers will be made adequate to stabilize the temperature of the coolant within its operating range. Of course, if the temperature of either the oil or the turbocharged air increases to a higher relative level within its temperature range than the relative temperature level of the coolant, that fluid will replace the coolant as the fluid which controls the radiator shutters and fan drive and its temperature signal will be translated through the associated one of diodes 41 and 42 to conductor 43. Thus, as in the case of FIG. 1, the control system is operated so that each of the coolant, oil and turbocharged air will be temperature controlled and will be prevented from exceeding its operating temperature range.

In brief, in the FIG. 2 embodiment the coolant flow control valve 77 is operated only in response to the sensed coolant temperature. After that valve becomes fully open, the hottest one of the coolant, oil and turbocharged air in its operating temperature range controls the radiator shutters 71 and the variable speed fan drive 14, the shutters and fan drive being sequenced properly so that the shutters will always be opened prior to energization of the fan drive.

While particular embodiments of the invention have been shown and described, modifications may be made, and it is intended in the appended claims to cover all such modifications as may fall within the true spirit and scope of the invention.

What is claimed is:

1. A temperature control system for an internal combustion engine having a radiator for cooling engine coolant, which flows around the engine jacket, and having first and second heat exchangers, in front of or within the radiator, for cooling first and second fluids, respectively, used in the engine, the coolant and the two fluids each having a different desired operating temperature range to achieve optimum engine performance, said temperature control system comprising:

first temperature sensing means for sensing the coolant temperature and producing a first temperature signal having an amplitude which is directly proportional to and representative of the relative level of the sensed coolant temperature within the coolant's operating temperature range;

second temperature sensing means for sensing the temperature of the first fluid and producing a second temperature signal having an amplitude which is directly proportional to and representative of the relative level of the sensed fluid temperature within the fluid's operating temperature range;

third temperature sensing means for sensing the temperature of the second fluid and producing a third temperature signal having an amplitude which is directly proportional to and representaive of the relative level of the sensed fluid within the fluid's operating temperature range;

a coolant flow control valve for controlling the amount of coolant diverted from the engine jacket and circulated through the radiator;

controllable radiator shutters for adjusting the amount of ram air impinging on the radiator and the two heat exchangers;

a variable speed fan drive for blowing a controlled amount of air through the radiator and the first and second heat exchangers;

means coupled to said first temperature sensing means for controlling said coolant flow control valve in response to said first temperature signal in order to maintain the coolant temperature within the desired operating temperature range;

means coupled to said first, second and third temperature sensing means for effectively selecting the particular one of the three temperature signals having the highest amplitude;

and means responsive to the selected temperature signal, when the signal's amplitude is within a predetermined relatively low amplitude range, for controlling said radiator shutters to adjust the amount of ram air striking the radiator and the first and second heat exchangers, and responsive to the selected temperature signal, when the signal's amplitude is within a predetermined relatively high amplitude range, for controlling said variable speed fan drive to vary the amount of air pulled in through the radiator and the first and second heat exchangers.

2. A temperature control system according to claim 1 wherein the first heat exchanger is an oil cooler for cooling the engine's lubricating oil and wherein the second heat exchanger is a turbocharged air cooler for cooling turbocharged air used by the engine.

3. A temperature control system according to claim 1 for also controlling the temperature of refrigerant flowing through the condenser of an air conditioning system thereby to control the refrigerant discharge pressure, the condenser being mounted in front of the radiator, including pressure sensing means for sensing the compressor discharge pressure of the refrigerant, which discharge pressure is directly proportional to the refrigerant temperature in the condenser, and an override circuit, responsive to said pressure sensing means when the sensed discharge pressure exceeds a predetermined maximum allowable level, for overriding the operation of the means, which responds to the selected temperature signal, to fully open the radiator shutters and to maximize the fan speed and thus the air pulled in through the condenser, thereby reducing the refrigerant temperature in the condenser and consequently the refrigerant discharge pressure.

* * * * *